United States Patent Office 2,905,886
Patented Sept. 22, 1959

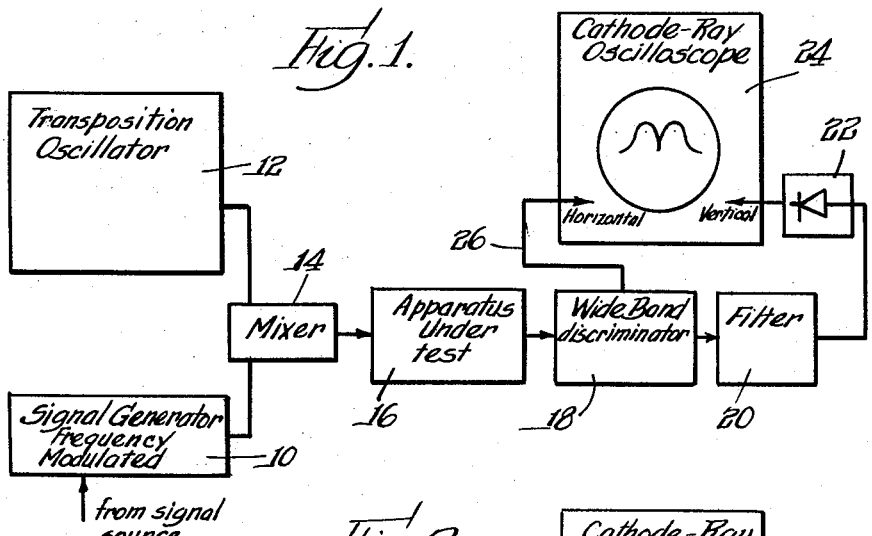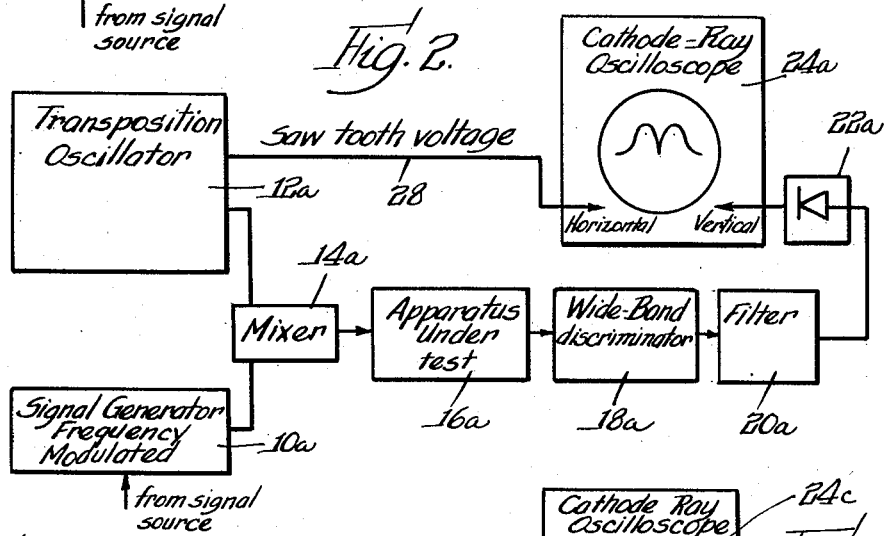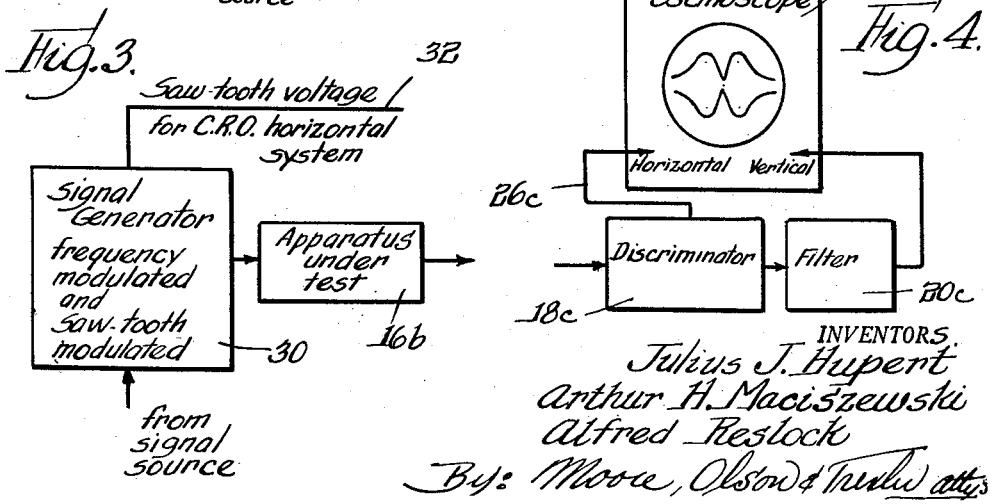

2,905,886

INSTRUMENT FOR ALIGNMENT OF FREQUENCY-SELECTIVE AMPLIFIERS

Julius J. Hupert, Arthur H. Maciszewski, and Alfred M. Reslock, River Forest, Ill., assignors to A. R. F. Products, Inc., River Forest, Ill., a corporation of Illinois Application February 2, 1953, Serial No. 334,688

11 Claims. (Cl. 324—57)

This invention is concerned with the alignment of frequency modulation and other circuits.

In many circuits such as frequency modulated receivers and amplifiers, transient reproducing amplifiers, and the like, and various parts of their circuits involving vacuum tube or transistor stages displaying frequency selective properties, the presence of undesirable non-linear distortion or intermodulation terms in the output is indicative of non-linearity of the curve $\phi$=function $(\omega)$, where $$\phi = \text{argument}\left(\frac{\hat{E}_2}{\hat{E}_1}\right)$$

and $\frac{\hat{E}_2}{\hat{E}_1}$ = ratio of output voltage to input voltage expressed in complex numbers involving the amplitude and phase of each voltage, $\hat{E}_1$ and $\hat{E}_2$ being vector values of the input and output voltages, respectively. Specifically, $$\frac{\hat{E}_2}{\hat{E}_1} = \left|\frac{\hat{E}_2}{\hat{E}_1}\right| \exp. j\left[\text{argument}\left(\frac{\hat{E}_2}{\hat{E}_1}\right)\right]$$

Various means and methods have been utilized in the past to align circuits to reduce this distortion to a minimum. Many such means and methods have relied upon the variation in gain of the tested device as a function of frequency. More specifically, with a constant input voltage the radio frequency or intermediate frequency voltage prior to demodulation is displayed on the screen of a cathode ray oscilloscope and is brought into a predetermined configuration by adjustment of the circuit under test.

Although the gain versus frequency display method, as just referred to, may be satisfactory for some purposes, it is not sufficiently accurate for high quality transmission and reproduction. While the existence of interdependence between the magnitude and phase of the function $$\frac{\hat{E}_1}{\hat{E}_2} = \text{function}(\omega)$$

is a fundamental law of physics, the quantitative relationships are such that only small differences in the shape of the magnitude function correspond to significant differences in the phase function.

Prior efforts to align frequency modulation circuits by means of cathode ray oscilloscopes have not been successful as significant changes in adjustment of a circuit have made only small and sometimes insignificant changes in the figure displayed on the oscilloscope screen.

An object of this invention is to provide improved means and methods for aligning frequency modulation circuits.

Another object of this invention is to provide means and methods for aligning frequency modulation circuits without recourse to the magnitude of the radio frequency or intermediate frequency signal as it varies with the input frequency.

More specifically, it is an object of this invention to provide means and methods of aligning frequency modulation circuits according to a function of the demodulated audio or other modulating signal.

This invention contemplates the alignment of frequency modulation circuits in accordance with the display of only the $n$th order harmonic distortion or intermodulation term of the test frequency or frequencies as displayed on an oscilloscope. In general, we rely on the $n$th order distortion. The second order distortion has been found eminently satisfactory in practice, and hereinafter will be used by way of illustration. As a first approximation, second order distortion can be expressed as:

$$D_2 = k\omega_m \Delta\Omega \left[\frac{d^2\phi}{d\omega^2}\right]_{\omega=\Omega \text{ inst}}$$

where:

$k$ = coefficient of proportionality
    $\omega_m$ = modulation frequency
    $\Delta\Omega$ = frequency deviation of signal frequency modulation; and
    $\left|\frac{d^2\phi}{d\omega^2}\right|_{\omega=\Omega \text{ inst}}$ = the absolute value of the second derivative of $\phi$=function $(\omega)$ assigned to the value of $\omega$ corresponding to the instantaneous value of the sweeping carrier.

Since the value of the second derivative of a function of a real variable at a point is a measure of the curvature of the curve representing the function at that point, alignment for minimum $D_2$ at the pass-band center guarantees the highest obtainable linearity of $\phi$=function $(\omega)$ at that point. Low $D_2$ over a considerable range of swept carrier frequency (swept carrier frequency generally is used for testing) is a sign of good linearity of $\phi$=function $(\omega)$ over that range.

In general, in carrying out the principles of our invention, the amplifier or the like to be tested is supplied with an input voltage consisting of a carrier swept (variable) at a slow rate and frequency modulated by a signal comprising a single sine wave or a combination of two sine waves of different frequencies. The single sine wave is used for the display of distortion terms, while the two sine waves of different frequencies are used for the display of intermodulation.

The frequency deviation of the input signal modulation desirably should be of low value compared to the total extent of sweep of the carrier. For the best accuracy of alignment the modulation signal should be of relatively high frequency since the observed distortion terms are of a value proportional to the modulation frequency as may be seen from the equations above. The carrier can be swept slowly over the band-pass range at a manually controlled rate, or mechanically, or electrically at a low audio frequency. The output of the amplifier or other circuit under test is filtered to remove all but the second order distortion term and is applied to the vertical plates of a cathode ray oscilloscope, the horizontal deflection plates being energized in proportion to the input frequency.

The invention best will be understood with reference to the ensuing description of specific examples of apparatus for carrying out the principles of our invention when taken in connection with the accompanying set of drawings wherein:

Fig. 1 is a schematic diagram illustrating one arrangement of apparatus assembled in accordance with the principles of our invention;

Fig. 2 is similar to Fig. 1 and illustrates a modification thereof;

Fig. 3 is a fragmentary schematic diagram illustrating a further modification; and Fig. 4 is another fragmentary schematic diagram illustrating a further modification of the invention.

Referring first to Fig. 1, there is shown a frequency modulated signal generator 10. The modulation signal preferably is of relatively high frequency, and for illustrative purposes may be assumed to be a single sine wave. A transposition oscillator 12 preferably is frequency modulated with a saw tooth wave shape. Alternatively, the frequency of the transposition oscillator may be varied manually or mechanically at a slow rate, for instance, at a relatively low audio frequency. The outputs of both the signal generator and transposition oscillator are applied to a mixer 14, and either the sum or the difference thereof is applied to the apparatus under test 16. The output of the apparatus under test is fed to a wide band discriminator 18 for demodulating the frequency modulation signal, the discriminator being substantially insensitive to variations of the amplitude of the signal. The term "wide band" will be understood as meaning that the discriminator is substantially insensitive to variations of the carrier frequency of the demodulated signal when the carrier signal is varied within the pass-band of the apparatus under test 16 and a reasonable distance on both sides of the pass-band.

The harmonic distortion, or intermodulation in case of a double sine wave input, thus is influenced almost exclusively by the behavior of the apparatus under test 16, and not by the discriminator. The output of the wide band discriminator is applied to the filter 20 which rejects the demodulated signal and linearly amplifies the voltage of the distortion (or intermodulation) frequency selected for display on the vertical plates of the cathode ray oscilloscope. (In this instance, "linearly" should be interpreted to mean "without compression or expansion.") The distortion (or intermodulation) frequency is applied to a rectifier 22 the output of which is supplied to a cathode ray oscilloscope 24. As shown in Fig. 1, the horizontal plates of the cathode ray oscilloscope are supplied with a varying direct current voltage proportional to the carrier frequency and developed by the wide band discriminator 18 by a connection 26.

In Fig. 2 the set-up is substantially the same as in Fig. 1 and the parts are numbered similarly with the addition of the suffix *a*. Repetition of a description of the similar parts is believed unnecessary, and the arrangement will be clearly understood with a recitation of the changes made. The connection 26 from the wide band discriminator 18 to the horizontal plates of the cathode ray oscilloscope 24 is eliminated and a connection 28 is provided between the transposition oscillator 12*a* and the horizontal plates of the cathode ray oscilloscope. This applies the modulating saw tooth voltage from the transposition oscillator directly to the horizontal deflection plates (or the horizontal amplifier) of the cathode ray oscilloscope. Similar results are obtained with either connection, the important thing being that the horizontal plates of the cathode ray oscilloscope are energized with the saw tooth or other variational frequency of the transposition oscillator. It will be understood that the "direct current voltage" supplied from the wide band discriminator 18 to the horizontal plates of the cathode ray oscilloscope is a varying unipotential voltage.

A partial modification of the circuit arrangement of Fig. 2 is shown in Fig. 3. In this embodiment, the signal generator 10*a*, the transposition oscillator 12*a*, and the mixer 14*a* have been replaced by a signal generator 30 which is both frequency modulated and saw tooth modulated. The output of the generator 30 is applied to the apparatus under test 16*b*. The remainder of the setup remains the same as in Fig. 2, the horizontal plates of the cathode ray oscilloscope being energized from the signal generator 30 by means of a connection 32.

A further modification of the invention is shown fragmentarily in Fig. 4. In this embodiment the setup as far as the discriminator is concerned is identical with the setup in Fig. 1, the wide band discriminator in Fig. 4 being identified with the numeral 18*c*. The output of the discriminator 18*c* is applied to a filter 20*c* similar to the filter 20 for rejecting the detected signal and amplifying the second harmonic distortion frequency, and the output of the filter 20*c* is applied directly to the vertical plates of the cathode ray oscilloscope 24*c* without rectification. The horizontal deflection plates are supplied with potential from the discriminator 18*c* by means of a connection 26*c*. The results are the same as in the previously described embodiments except that a picture is obtained on the cathode ray oscilloscope screen which is symmetrical about a horizontal axis, whereas in the previous embodiments the entire picture lay above a horizontal line, all as may be seen in the drawings.

It has been shown that the second order distortion is an indication of the small residual nonlinearity of the transmission, and that frequency modulation amplifiers and the like therefore can be aligned without recourse to the magnitude of the output of the amplifier or other apparatus to be tested. Embodiments of the invention other than those specifically shown and described are possible. The methods of utilizing the testing equipment and the apparatus constituted by the equipment as set up are believed to be novel both as to the specific embodiment shown and variations thereof, all as set forth in the following claims.

We claim:

1. A phase-frequency response system for dynamically displaying distortion, unwanted intermodulation or the like produced by a network to be tested, comprising means to display a first variable as a function of a second variable, means to generate a carrier signal of uniformly swept frequency and frequency modulated by a second wave form to impress on the carrier signal a modulated shape, means to apply a signal proportional to the uniformly swept frequency of the carrier signal to said display means as the first variable input thereto, means to feed the uniformly swept carrier signal having the frequency modulated shape thereon through the network to be tested, a wide-band discriminator connected to the output of the network to be tested to demodulate the second wave form from the frequency modulated carrier signal, a filter connected to the output of said discriminator to filter out the fundamental frequencies of the modulated shape and to pass an $n$th order harmonic wherein $n$ is at least two of the modulated shape caused by non-linear distortion thereof, and means to connect the output of said filter to said display means as the second variable input thereto.

2. A phase-frequency response system for dynamically displaying distortion, unwanted intermodulation or the like produced by a network to be tested, comprising means to display a first variable as a function of a second variable, means to generate a carrier signal of uniformly swept frequency and frequency modulated by a second wave form to impress on the carrier signal a modulated shape, means to apply a signal proportional to the uniformly swept frequency of the carrier signal to said display means as the first variable input thereto, means to feed the uniformly swept carrier signal having the frequency modulated shape thereon through the network to be tested, a wide-band discriminator connected to the output of the network to be tested to demodulate the second wave form from the frequency modulated carrier signal, means to produce a signal proportional to the second derivative of the phase shift caused by non-linear distortion of the modulated shape, and means to apply the last-mentioned signal as the second variable input to said display means to display the instantaneous change of the modulated shape delay caused by non-linear distortion of the modulated shape.

3. A phase-frequency response system for dynamically displaying distortion, unwanted intermodulation or the like produced by a network to be tested comprising means to display a first variable as a function of a second variable, means to generate a carrier signal of uniformly swept frequency and frequency modulated by a second wave form, means to apply a signal proportional to the uniformly swept frequency of the carrier signal to said display means as the first variable input thereto, means to feed the uniformly swept and second wave form frequency modulated carrier signal through the network to be tested, a wide-band discriminator connected to the output of the network to be tested to demodulate the second wave form from the frequency modulated carrier signal, and a filter connected to the output of said discriminator to filter out the fundamental frequency of the modulating wave forms and to pass an $n$th order harmonic wherein $n$ is at least two of the modulated wave form caused by non-linear distortion of the modulated wave form, the output of said filter being connected to said display means as the second variable input thereto.

4. A phase-frequency response system for dynamically displaying distortion, unwanted intermodulation or the like produced by a network to be tested comprising an oscilloscope to display a first variable input as a function of a second variable input, means to generate a carrier signal of uniformly swept frequency and frequency modulated by a sine wave, means to apply a signal proportional to the uniformly swept frequency of the carrier signal to said oscilloscope as the first variable input thereto, means to feed the uniformly swept and sine wave frequency modulated carrier signal through the network to be tested, a wide-band discriminator connected to the output of the network to be tested to demodulate the sine wave from the frequency modulated carrier signal, a filter connected to the output of said discriminator to filter out the fundamental frequency of the modulating wave form and to pass an $n$th order harmonic of wherein $n$ is at least two of the modulated wave form caused by non-linear distortion of the modulated wave form, and a rectifier connected to the output of said filter, the output of said rectifier being connected to said oscilloscope as the second variable input thereto.

5. A phase-frequency response system for dynamically displaying distortion, unwanted intermodulation or the like produced by a network to be tested comprising an oscilloscope to display a first variable input as a function of a second variable input, means to generate a carrier signal frequency modulated by a sine wave, a transposition oscillator to generate a carrier signal sweep frequency, a mixer connected to said transposition oscillator and said carrier signal generator to sweep the carrier signal at the rate of said transposition oscillator, means to connect the output of said mixer to the network to be tested, a wide-band discriminator connected to the output of the network to be tested to demodulate the sine wave from the frequency modulated carrier signal, means to apply a signal proportional to the modulating component of the output of said transposition oscillator to said oscilloscope as the first variable input thereto, a filter connected to the output of said discriminator to filter out the fundamental frequency of the modulating wave form and to pass an $n$th order harmonic wherein $n$ is at least two of the modulated wave form caused by non-linear distortion of the modulated wave form, and a rectifier connected to the output of said filter, the output of said rectifier being connected to said oscilloscope as the second variable input thereto.

6. A phase-frequency response system as set forth in claim 5, wherein the signal proportional to the modulating component of the output of the transposition oscillator is taken from the discriminator and applied to the oscilloscope as the first variable input thereto.

7. A phase-frequency response system as set forth in claim 5, wherein the signal proportional to the modulating component of the output of the transposition oscillator is taken directly from the modulating voltage of the transposition oscillator and applied to the oscilloscope as the first variable input thereto.

8. A phase-frequency response system for dynamically displaying distortion, unwanted intermodulation or the like produced by a network to be tested comprising means to display a first variable as a function of a second variable, means to generate a carrier signal swept at a uniform and relatively low frequency and frequency modulated by a sine wave having a relatively high audio frequency, means to apply a signal proportional to the uniformly swept frequency of the carrier signal to said display means as the first variable input thereto, means to feed the swept and sine wave frequency modulated carrier signal through the network to be tested, a wide-band discriminator connected to the output of the network to be tested to demodulate the sine wave from the frequency modulated carrier signal, and a filter connected to the output of said discriminator to filter out the fundamental frequency of the modulated wave form and to pass the second harmonic of the modulated wave form caused by non-linear distortion of the modulated wave form, the output of said filter being connected to said display means as the second variable input thereto.

9. A phase-frequency response system for dynamically displaying distortion, unwanted intermodulation or the like produced by a network to be tested comprising an oscilloscope to display a first variable input as a function of a second variable input, means to generate a carrier signal frequency modulated by a sine wave and uniformly swept in frequency, the rate at which the carrier signal is swept being relatively low and the frequency of the sine wave being a relatively high audio frequency, means to apply a signal proportional to the uniformly swept frequency of the carrier signal to said oscilloscope as the first variable input, means to feed the sine wave frequency modulated and uniformly swept carrier signal through the network to be tested, a wide-band discriminator connected to the output of the network to be tested to demodulate the sine wave from the frequency modulated carrier signal, a filter connected to the output of said discriminator to filter out the fundamental frequency of the modulated wave form and to pass the second harmonic of the modulated wave form caused by non-linear distortion of the modulated wave form, and a rectifier connected to the output of said filter, the output of said rectifier being connected to said oscilloscope as the second variable input thereto.

10. A phase-frequency response system for dynamically displaying distortion, unwanted intermodulation or the like produced by a network to be tested comprising means to display a first variable as a function of a second variable, means to generate a carrier signal of uniformly swept frequency and frequency modulated by two sine waves of different frequencies, means to apply a signal proportional to the uniformly swept frequency of the carrier signal to said display means as the first variable input thereto, means to feed the uniformly swept and sine wave frequency modulated carrier signal through the network to be tested, a wide-band discriminator connected to the output of the network to be tested to demodulate the sine wave from the frequency modulated carrier signal, and a filter connected to the output of said discriminator to filter out the fundamental frequencies and the sum and difference frequencies of the sine waves and to pass unwanted intermodulation signals of the sine waves, the output of said filter being connected to said display device as the second variable input thereto.

11. A phase-frequency response system for dynamically displaying distortion, unwanted intermodulation or the like produced by a network to be tested comprising an oscilloscope to display a first variable input as a function of a second variable input, means to generate a carrier signal frequency modulated by two sine waves of different frequencies and uniformly swept in frequency, means to apply a signal proportional to the uniformly swept frequency of the carrier signal to said oscilloscope as the first variable input, means to feed the sine wave frequency modulated and uniformly swept carrier signal through the network to be tested, a wide-band discriminator connected to the output of the network to be tested to demodulate the sine wave from the frequency modulated carrier signal, the rate at which the carrier signal is swept being relatively low and the frequencies of the sine waves being relatively high audio frequencies, a filter connected to the output of said discriminator to filter out the fundamental frequencies and the sum and difference frequencies of the sine waves and to pass the unwanted intermodulation frequencies, and a rectifier connected to the output of said filter, the output of said rectifier being connected to said oscilloscope as the second variable input thereto.

References Cited in the file of this patent

UNITED STATES PATENTS

| | | |
|---|---|---|
| 2,162,827 | Schrader | June 20, 1939 |
| 2,280,607 | Roberts | Apr. 21, 1942 |
| 2,380,791 | Rosencrans | July 31, 1945 |
| 2,625,614 | Schelleng | Jan. 13, 1953 |
| 2,671,198 | Beverly | Mar. 2, 1954 |